(12) United States Patent
Thome et al.

(10) Patent No.: US 8,971,477 B2
(45) Date of Patent: Mar. 3, 2015

(54) INTEGRAL HELICAL COIL PRESSURIZED WATER NUCLEAR REACTOR

(75) Inventors: Ted L. Thome, Cuyahoga Falls, OH (US); Mathew W. Ales, Forest, VA (US); Billy E. Bingham, Lynchburg, VA (US); John D. Malloy, Goode, VA (US)

(73) Assignee: Babcock & Wilcox mPower, Inc., Charlotte, NC (US)

( * ) Notice: Subject to any disclaimer, the term of this patent is extended or adjusted under 35 U.S.C. 154(b) by 801 days.

(21) Appl. No.: 12/796,626

(22) Filed: Jun. 8, 2010

(65) Prior Publication Data

US 2010/0316181 A1 Dec. 16, 2010

Related U.S. Application Data

(60) Provisional application No. 61/185,878, filed on Jun. 10, 2009.

(51) Int. Cl.
G21C 1/00 (2006.01)
G21C 1/32 (2006.01)
F22B 1/02 (2006.01)
F22B 21/26 (2006.01)

(52) U.S. Cl.
CPC ............. *G21C 1/322* (2013.01); *F22B 1/023* (2013.01); *F22B 21/26* (2013.01); *Y02E 30/40* (2013.01); *Y10S 376/909* (2013.01)
USPC .......................................... 376/458; 376/909

(58) Field of Classification Search
USPC .................................................. 376/458, 909
See application file for complete search history.

(56) References Cited

U.S. PATENT DOCUMENTS

| 3,660,231 | A | * | 5/1972 | Fox et al. | 376/384 |
|---|---|---|---|---|---|
| 4,072,563 | A | * | 2/1978 | McDonald et al. | 376/406 |
| 5,006,303 | A | * | 4/1991 | Rowlands | 376/282 |
| 5,053,190 | A | * | 10/1991 | Gardner et al. | 376/366 |
| 5,076,999 | A | * | 12/1991 | Forsberg | 376/282 |
| 6,813,328 | B2 | * | 11/2004 | Kitch et al. | 376/406 |
| 2005/0135539 | A1 | * | 6/2005 | Joly et al. | 376/262 |

OTHER PUBLICATIONS

"Pressure drop oscillation of steam-water two-phase flow in a helically coiled tube," Guo, et al., International Journal of Heat and Mass Transfer 44 p. 1557 May 28, 2000.*

Guo et al., "Pressure Drop Oscillation of Steam-Water Two-Phase Flow in a Helically Coiled Tube." Int. J. of Heat & Mass Trans. 44 (2001) 1555-1564.*

* cited by examiner

*Primary Examiner* — Jack W Keith
*Assistant Examiner* — Sean P Burke
(74) *Attorney, Agent, or Firm* — Michael J. Seymour; Eric Marich

(57) ABSTRACT

An integral pressurized water nuclear reactor for the production of steam utilizing a helical coil steam generator, a plurality of internal circulation pumps, and an internal control rod drive mechanism structure.

13 Claims, 17 Drawing Sheets

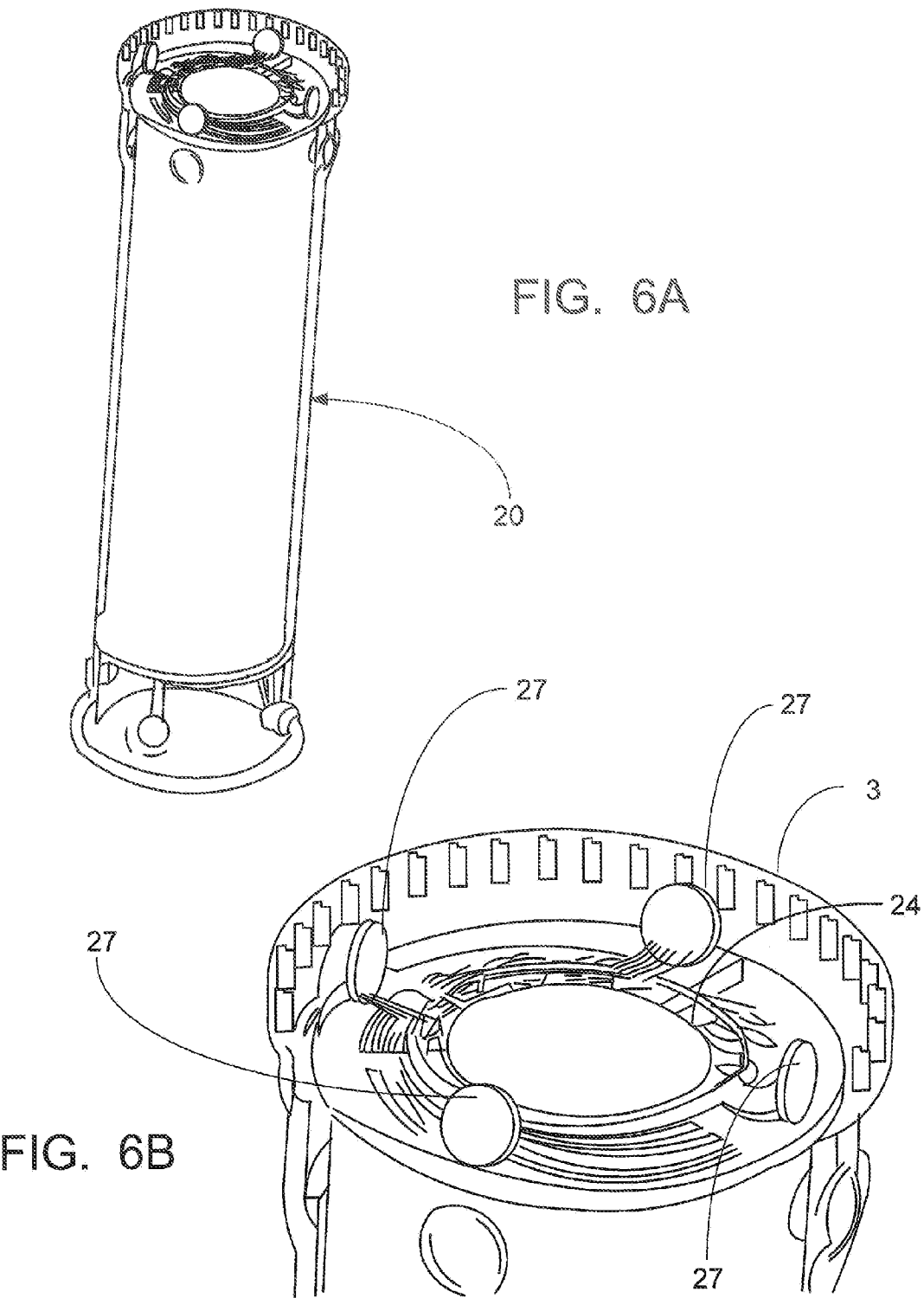

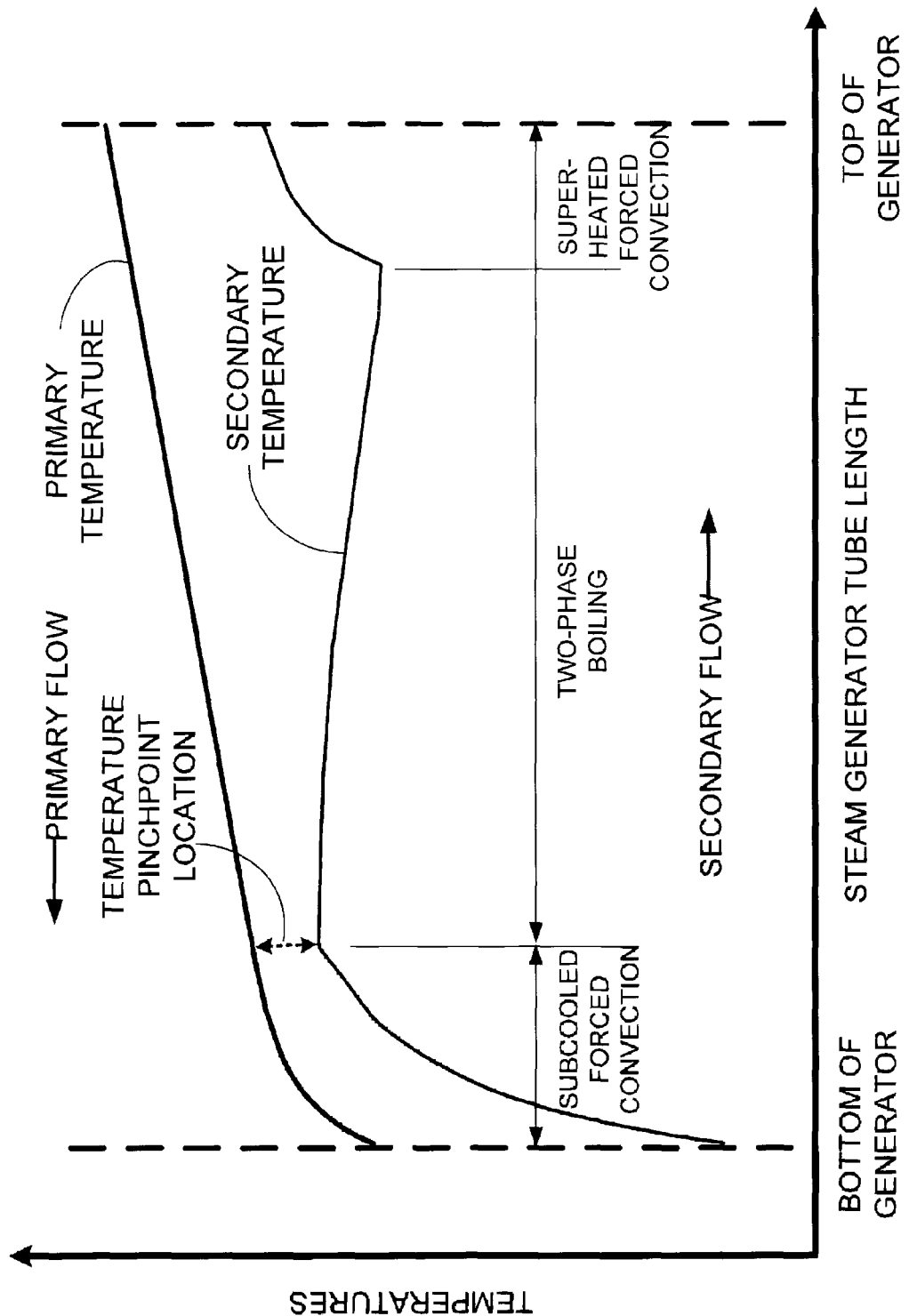

INTEGRAL HELICAL COIL PRESSURIZED WATER NUCLEAR REACTOR

This application claims the benefit of U.S. Provisional Application No. 61/185,878 filed Jun. 10, 2009. U.S. Provisional Application No. 61/185,878 filed Jun. 10, 2009 is incorporated herein by reference in its entirety.

BACKGROUND

The following relates to the nuclear power arts, nuclear power safety arts, nuclear reactor control arts, and related arts.

Existing integral pressurized water reactor (PWR) designs place the core generally at the bottom, with steam generators overlapping or wholly above the core in the vertical direction. These PWR design can employ natural convection where the core heats the primary coolant which then rises in a central riser and then comes back down in an outer annular region, sometimes called the downcomer region. Alternatively, forced convection can be employed, in which the circulation of the primary coolant is driven by pumps. In the latter design, the pumps are disposed at the bottom of the reactor or above the steam generators in the downcomer region and coupled with the steam generators to force the primary coolant downward into the steam generators.

Some examples of such reactors are disclosed in: U.S. Pat. No. 6,813,328; "Consolidated Nuclear Steam Generator for Marine Application", The Engineer (Aug. 21, 1964); and U.S. Pat. No. 4,072,563, each of which is incorporated herein by reference in its entirety.

BRIEF SUMMARY

In one aspect, a PWR having a three-section design is disclosed. The reactor core is located in the lower section, the steam generators are located wholly above the core in an upper section, and the pumps are placed in the downcomer region at a third middle section located in the gap between the upper section with the steam generators and the lower section with the core. In this middle location, the pumps are optimally positioned downstream of coolant flow such that that the pump operate in a relatively cooler environment. Further, more even circulation is achieved, as the pumps both "pull" primary coolant through the steam generators and "push" primary coolant downward to the core. An axial flow pump(s) may be utilized.

Another aspect of the disclosure is that all reactor vessel penetrations that can result in significant reactor coolant loss during operation are located far above the core.

In another aspect a gap between the steam generators and the core is also available as a mechanical support for the control rod drive mechanisms (CRDM) and related structures.

In another aspect of the disclosure, the steam generator tubes are helically wrapped around the primary flow riser pipe. Packing efficiency can be very high and heat is transferred from the downward flowing primary coolant and possibly also from the primary coolant flowing upward through the primary flow riser pipe, thus reducing opportunity for heat loss and improving efficiency.

In another aspect of the disclosure, dedicated passive decay heat removal system (DHRS) heat exchangers are provided, and are located proximate to the reactor core. This places the heat exchangers in optimal position for passive decay heat removal, and eliminates the complex valving involved with using the steam generators as components of the DHRS since the disclosed dedicated passive DHRS is wholly separate from the steam generator. Redundancy can be incorporated by providing several DHRS heat exchangers. Optionally, the steam generators may also be connected with the emergency cooling tanks for further redundancy, with this latter connection valved off in the event primary coolant level drops low enough to expose the steam generators. Since the dedicated DHRS heat exchangers are near the reactor core, they remain operative so long as the primary coolant is at least high enough to immerse the core. These heat exchangers may also be designed to operate in a condensation mode, flowing primary coolant that has turned to steam.

In another aspect of the disclosure, a method of supporting the core including individual fuel assemblies in a modular reactor is disclosed. The fuel assemblies are supported by a bottom grid structure that is part of a welded core support structure of 304L stainless steel or another suitable material which is suspended from a flange on the lower reactor vessel. Lugs on the inside of the lower reactor vessel center the core support structure. The fuel assembly is supported laterally within the core support structure via a core former assembly. This assembly is optionally octagonal in shape to allow for transfer of the entire set of fuel assemblies to the spent fuel pool. The optional octagonal shape also provides space for dedicated decay heat removal heat exchangers to be disposed between the lower vertical support shroud and the lower reactor vessel. The core former assembly is suitably a welded and machined structure made of 304L stainless steel or another suitable material. The lower shroud assembly supports the fuel assemblies and the core former structure, and is suitably a welded and machined structure of 304L stainless steel or another suitable material. The upper portion of the lower shroud optionally contains bypass flow orifices which allow the decay heat removal heat exchangers to function when the water level is too low to circulate past the steam generator, such as may be the case during core refueling or certain types of loss of coolant accident (LOCA) conditions. The bypass flow orifices are optionally located in the core support shroud in an area where the outside diameter is increased within the lower reactor vessel to provide a reduced area hence higher flow velocity in the annulus between the reactor vessel and the core support shroud during normal operation to prevent reactor coolant from flowing inward through the bypass orifices and bypassing the core. The disclosed design of the core support assembly provides for complete core refueling.

In yet another aspect of the disclosure, the above aspects are combined to form a new and unique PWR design.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 6A-6D are perspective views of a PWR helical coil steam generator.

FIG. 8 illustrates a steam generator temperature profile.

DETAILED DESCRIPTION OF PREFERRED EMBODIMENTS

Figure 1:
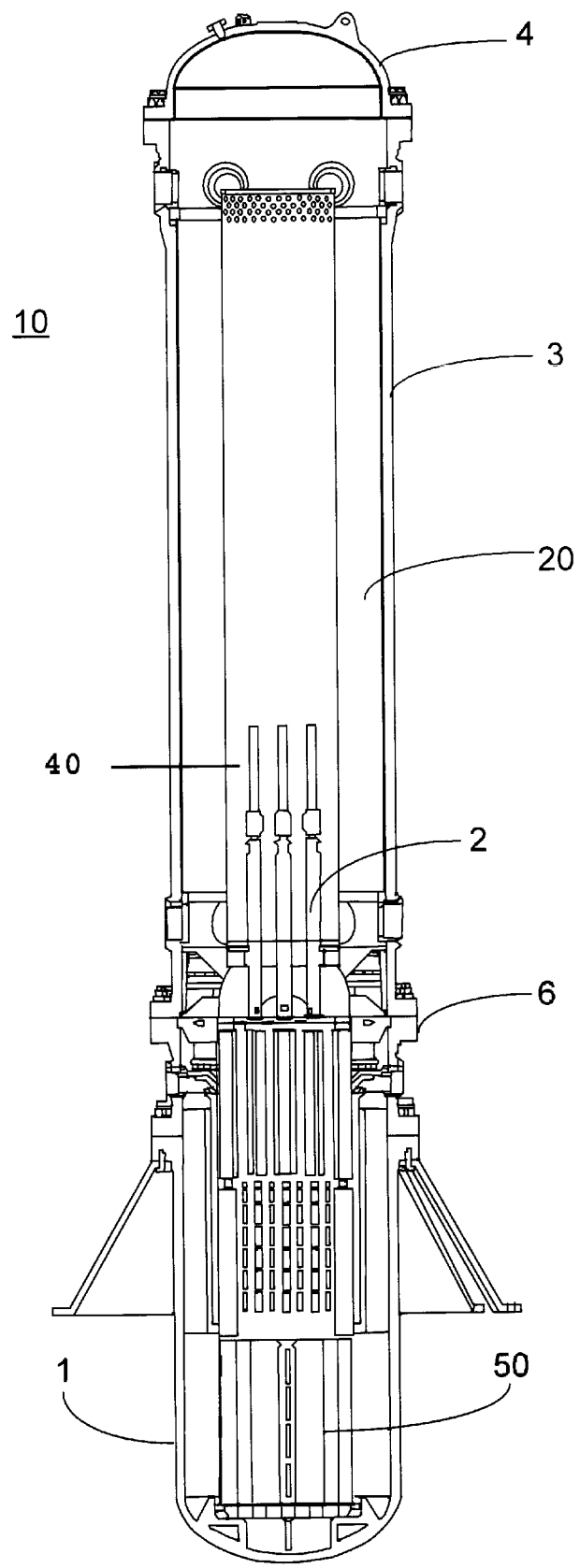
FIG. 1 is a sectional side view of a pressurized water reactor (PWR).

Referring to the drawing generally, wherein like reference numerals designate same of functionally similar parts, FIG. 1 is a section side view of a pressurized water reactor (PWR), generally designated 10, according to the present invention. The illustrated primary vessel contains the reactor core 50, internal helical steam generators 20, and internal control rod drive mechanisms 40 (CRDM). The illustrative reactor vessel includes four major components, namely: the lower vessel 1, the upper internals 2, the upper vessel 3, and the upper vessel head 4. Other vessel configurations are also contemplated.

Figure 2:
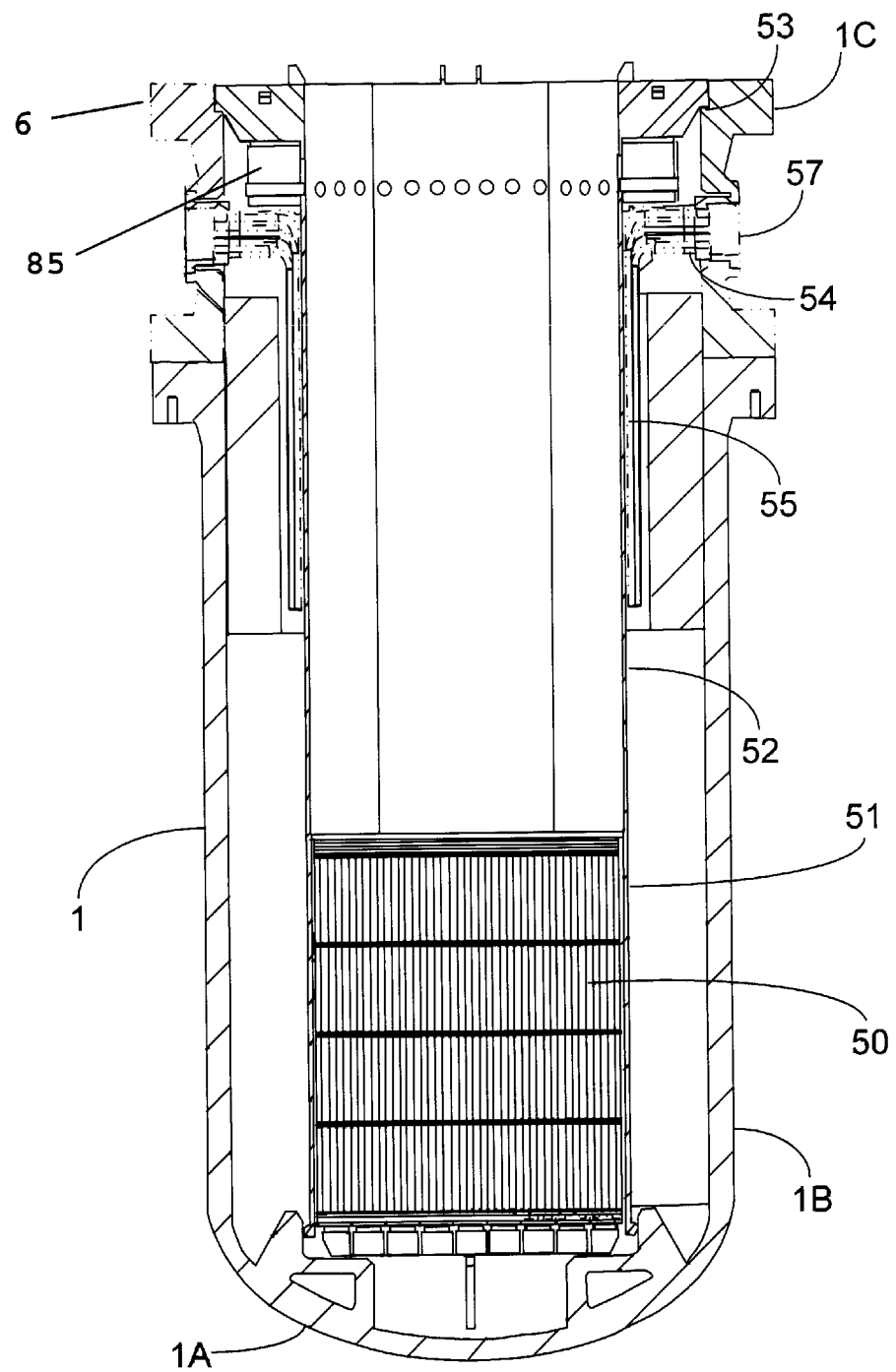
FIG. 2 is a sectional side view of a lower vessel of a PWR.
Figure 2A:
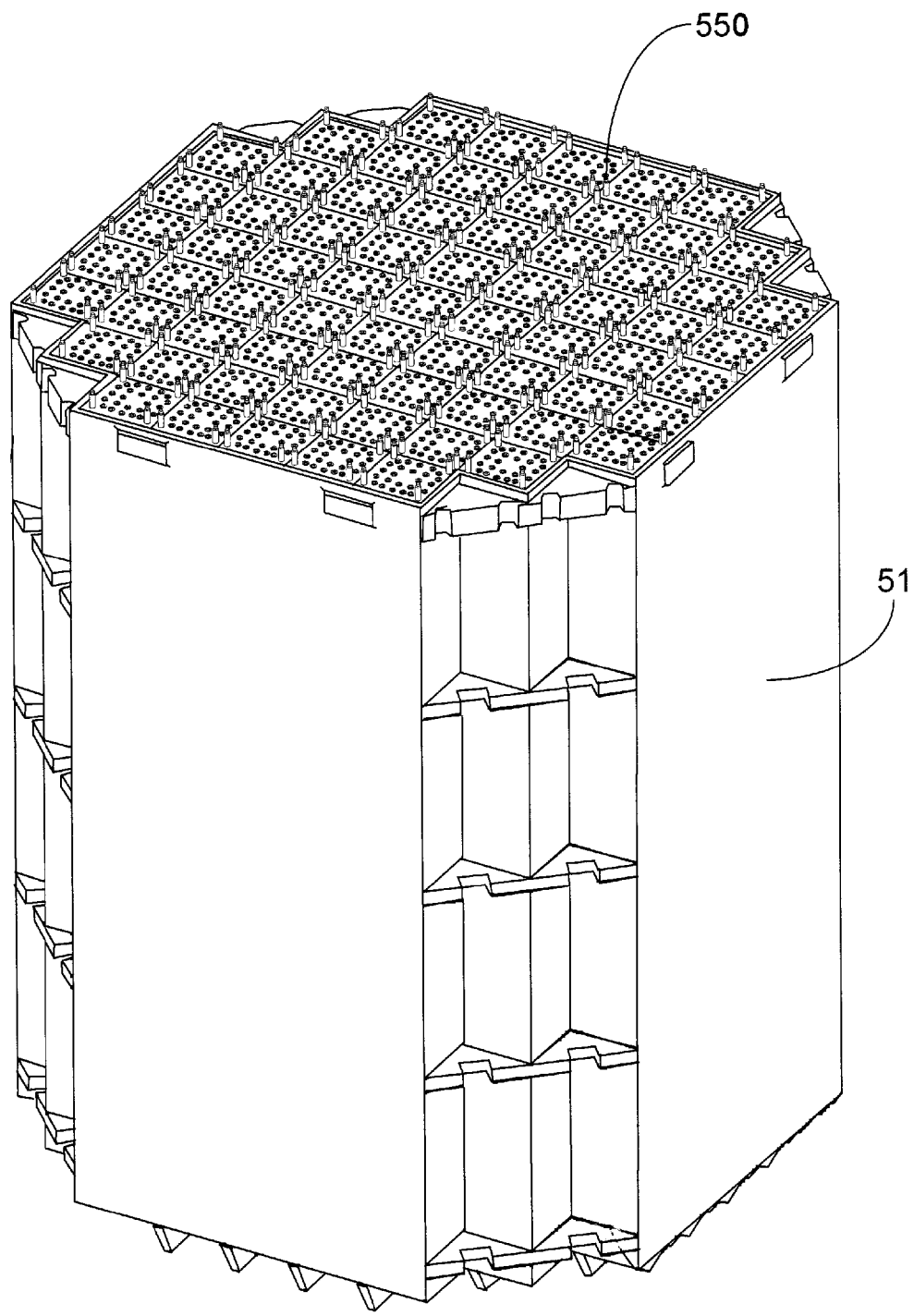
FIG. 2A is a perspective view of a core former structure.

With continuing reference to FIG. 1 and with further reference to FIG. 2 which shows the lower vessel 1, the lower vessel 1 contains the reactor core 50. The reactor core 50 can have substantially any configuration compatible with a light water reactor. In one suitable embodiment, the reactor core 50 includes 69 shortened 17×17 PWR type fuel assemblies supported by a bottom grid structure that is part of a core former structure 51. An illustration of a core former structure 51 is shown in FIG. 2A.

The illustrated octagonal configuration allows for transfer of the entire set of fuel assemblies 550 to the spent fuel pool. The illustrated octagonal shape of the lower vertical support shroud 52 (FIG. 2B) also provides space 56 for dedicated decay heat removal system (DHRS) heat exchangers 55 to be disposed between the lower vertical support shroud 52 and the lower reactor vessel 1 (FIG. 2).

The core former structure 51 is suitably a welded and machined structure made of 304L stainless steel or another suitable material. The lower shroud assembly 52 (FIG. 2B) supports the core former 51 and fuel assemblies 55. The upper portion of the lower shroud 52 optionally contains bypass flow orifices 67 which allow the DHRS heat exchangers to function when the water level is too low to circulate past the steam generator, such as may be the case during core refueling or certain types of loss of coolant accident (LOCA) conditions. The bypass flow orifices 67 are optionally located in the lower support shroud 52 in an area where the outside diameter is increased within the lower reactor vessel to provide a reduced area hence higher flow velocity in the annulus between the reactor vessel and the core support shroud during normal operation to prevent reactor coolant from flowing inward through the bypass orifices and bypassing the core.

Figure 2B:
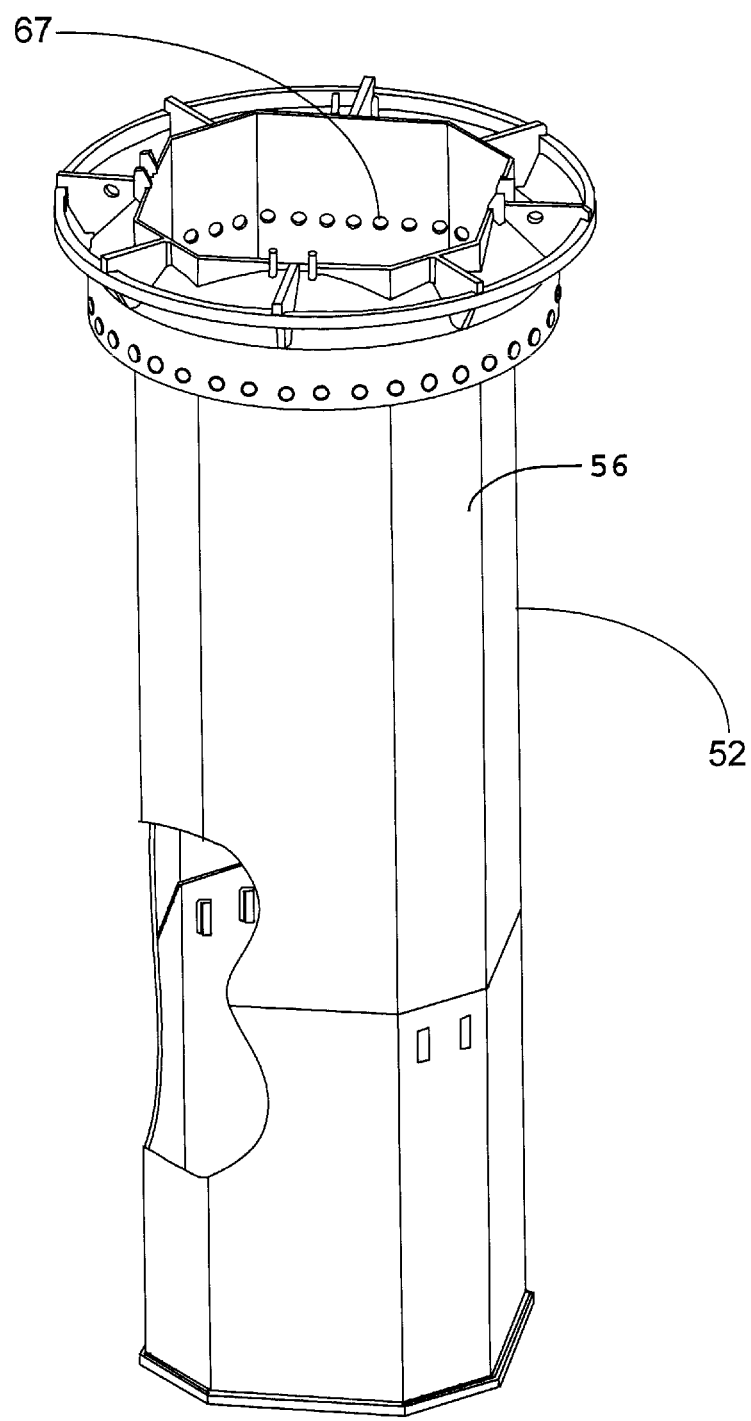
FIG. 2B is a perspective view of a lower shroud structure.

Optionally, this core former structure 51 is replaced with each refueling. The core former 51 is supported by a lower shroud 52 which is in turn, is supported from a flange 53 of the upper spool portion 6 of the lower vessel 1 and is centered by lugs attached to the inside of the lower vessel elliptical head. Optionally, these lugs can also support the weight of the core 50 in the event that the lower shroud 52 should need a structural supporting member. An illustration of a lower shroud 52 is shown in FIG. 2B.

Figure 3:
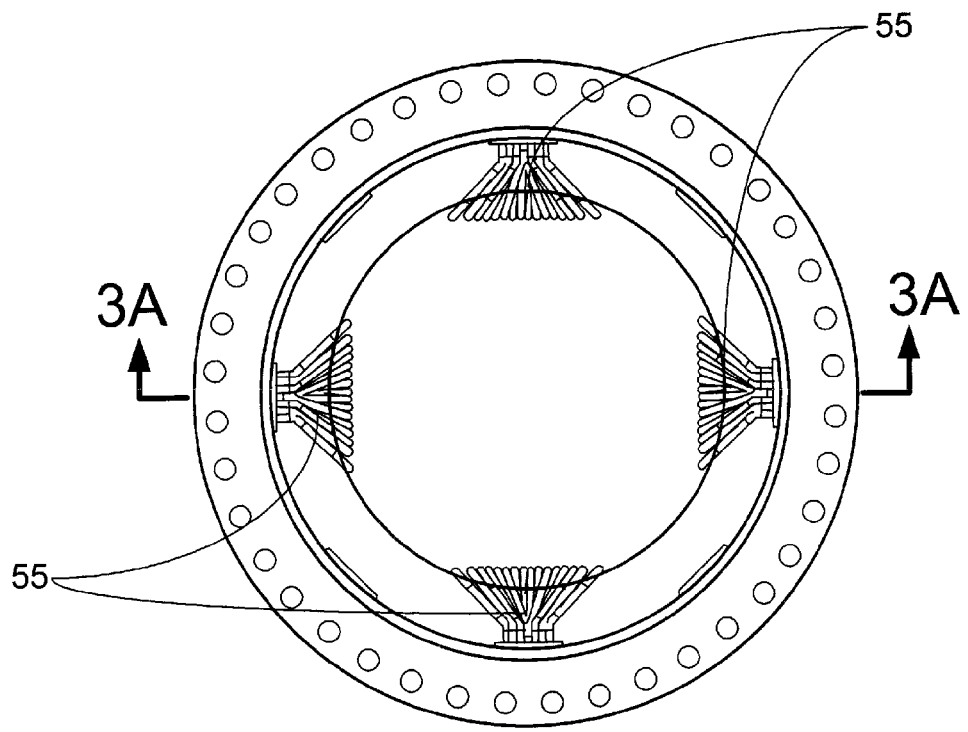
FIG. 3 is top view of a lower vessel of a PWR.
Figure 3A:
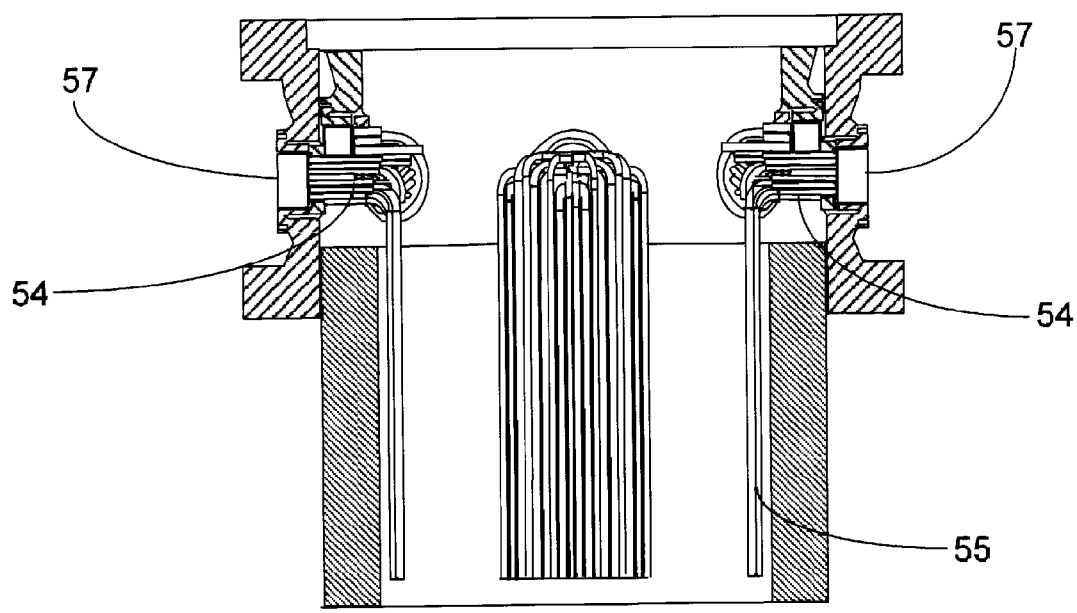
FIG. 3A is a section side view of FIG. 3 along section 3A.

The lower vessel 1 may house a dedicated decay heat removal system (DHRS) in an annulus between the lower shroud 52 and the lower vessel 1. In the illustration of FIGS. 3 and 3A, redundant DHRS heat exchangers 55, each of which is a helical coil design (straight tube designs are also contemplated) with primary coolant on the shell side, are shown. The tubes are connected to tube sheets 54 attached to the nozzles 57. Tube size, thickness and material is optionally the same as the steam generators discussed later herein. The dedicated decay heat removal system heat exchangers 55 can be disposed elsewhere in proximity to the reactor core 50, with the location preferably selected to optimize their utility as components of a DHRS. Advantageously, because these heat exchangers 55 are not part of the steam generation system they can be placed optimally for decay heat removal in the event of a reactor emergency. For example, by extending the dedicated heat exchangers 55 of the DHRS low within the pressure vessel, they remain useful even during a loss of coolant accident (LOCA) in which the primary coolant level drops below the level of the steam generators.

With further reference to FIG. 2, in some embodiments the lower vessel 1 comprises three forgings of SA508 Gr 4N Cl 2 carbon steel. One forging is the lower head 1A which may be of a circular or elliptical configuration and in one configuration is about 4.125" thick. The second forging is the cylindrical shell 1B section which may be about 4.75" thick and the third forging is the upper spool/flange section 1C. The final weldment is preferably clad internally with 0.25" stainless steel. This illustrative arrangement of the vessel sections has the advantage of eliminating welds near the core mid-plane where the fluence levels are highest.

Figure 4:
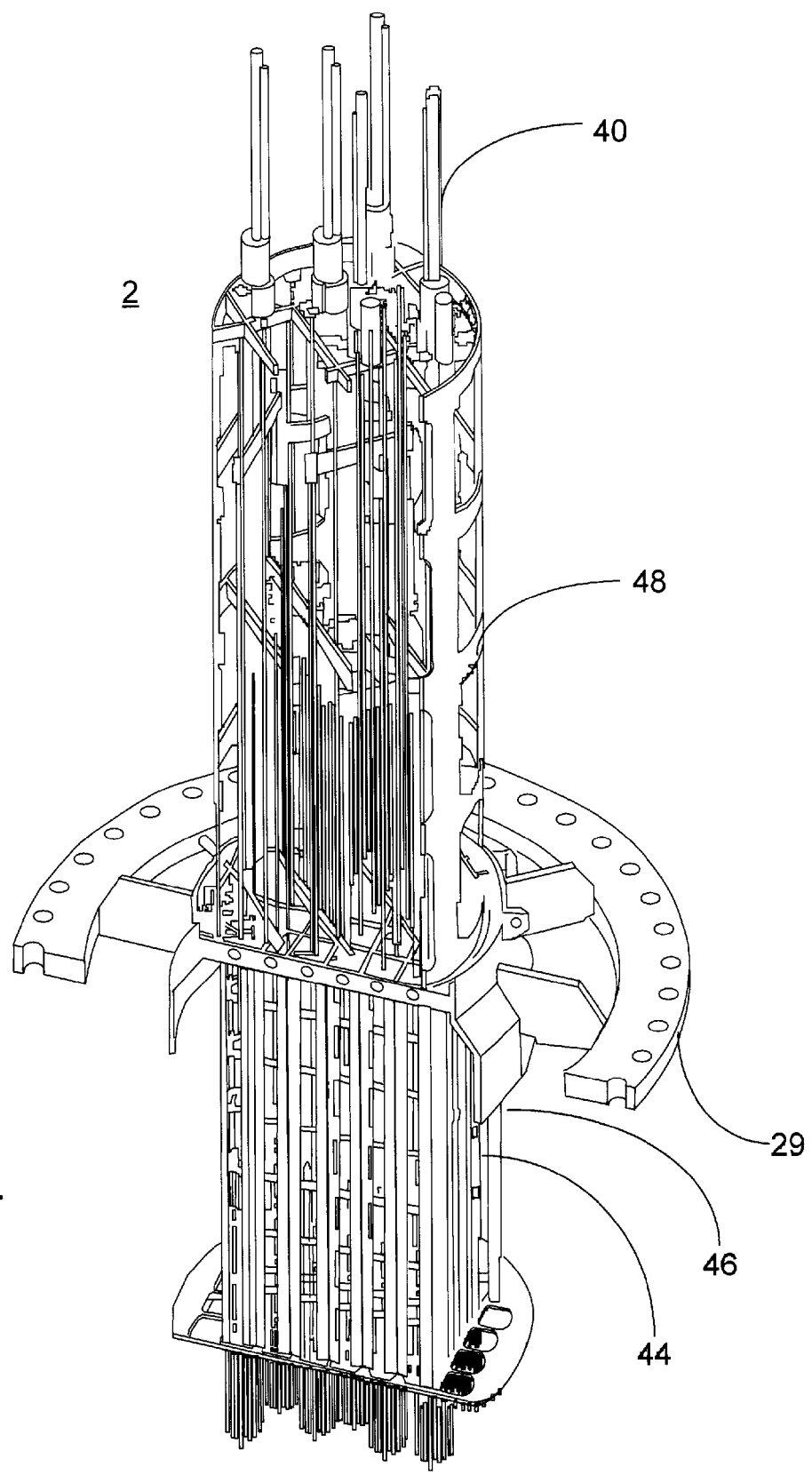
FIG. 4 is a perspective view of a upper internals structure.

With reference to FIG. 1 and with further reference to FIG. 4, the upper internals structure 2 provides support for control rod drives 40 and control rod guide frames 44 and is also a suitable structure through which control rod drive power and control instrumentation signals can pass. This allows the upper vessel 3 and integral steam generator 20 to be removed independently of the control rod drives 40 and associated structure 48. The upper internals structure 2 is generally composed of an upper internals basket 46, a CRDM support structure 48, control rod guide frames 44, a mid flange 29, and the control rod drive mechanisms 40.

Figure 5:
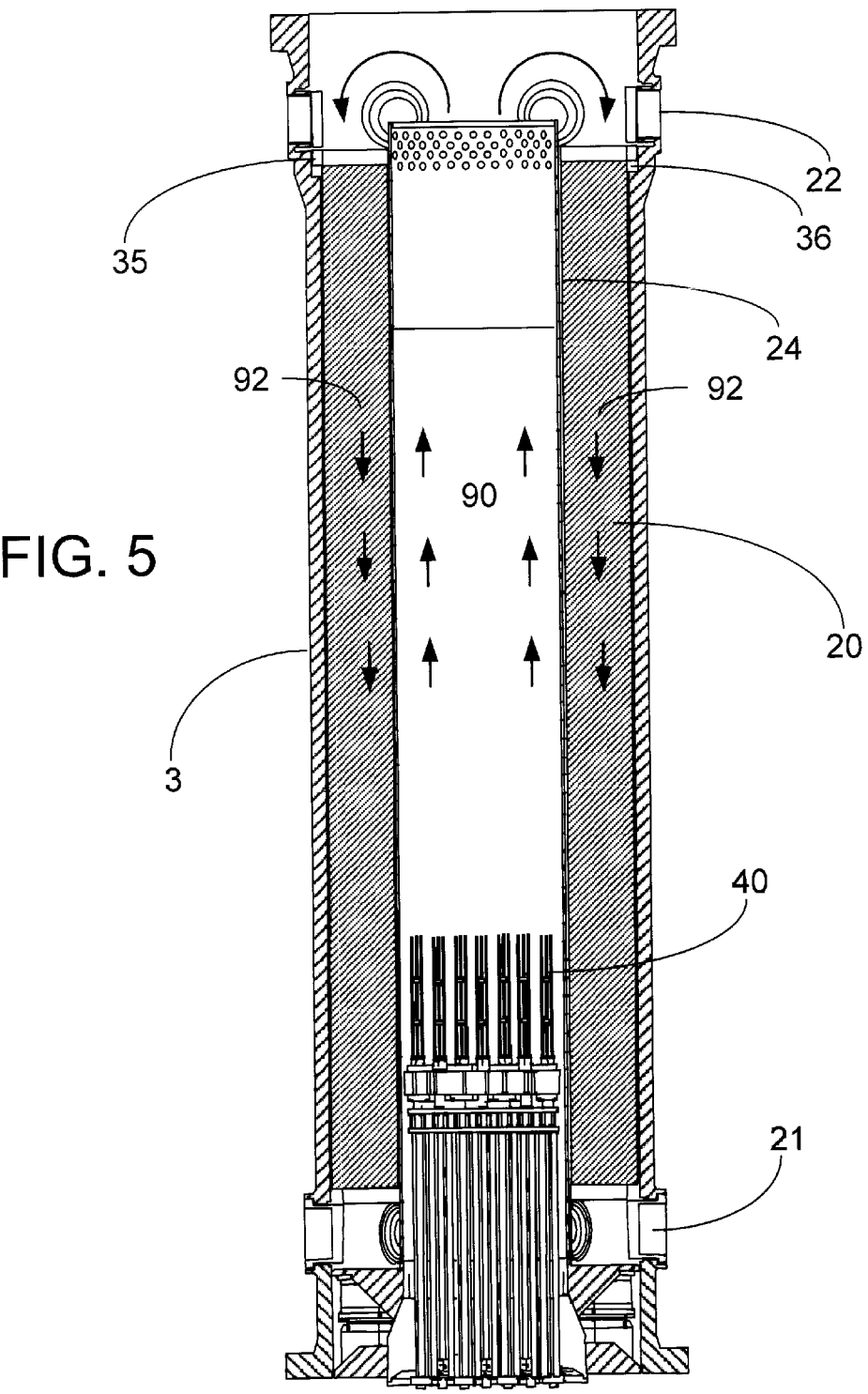
FIG. 5 is sectional side view of a upper vessel of a PWR.
Figure 6C:
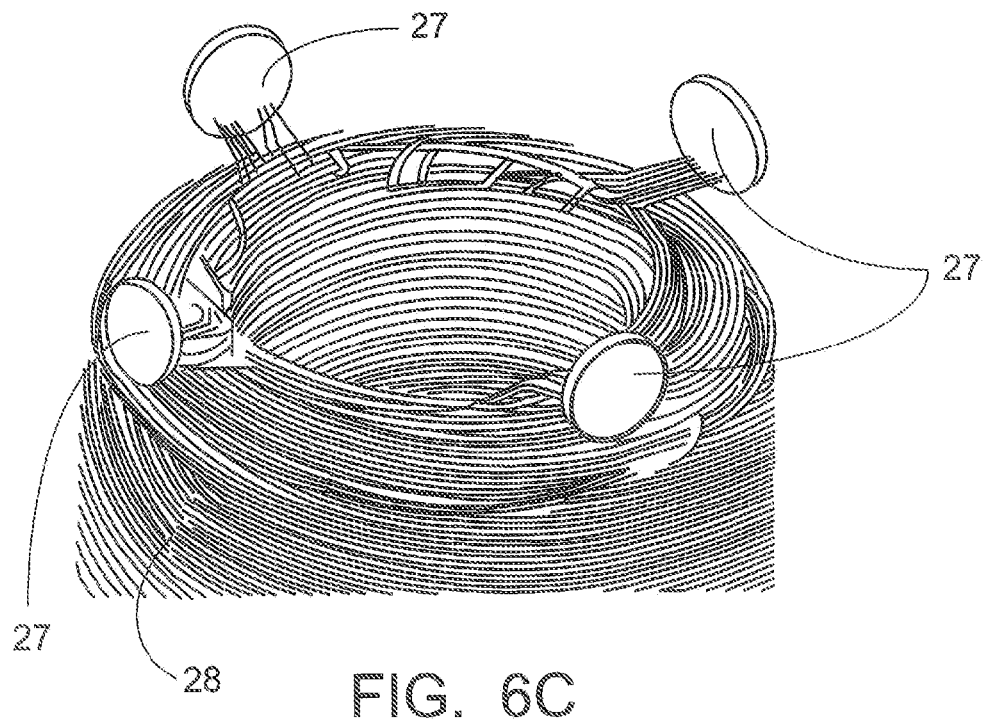
Figure 6D:
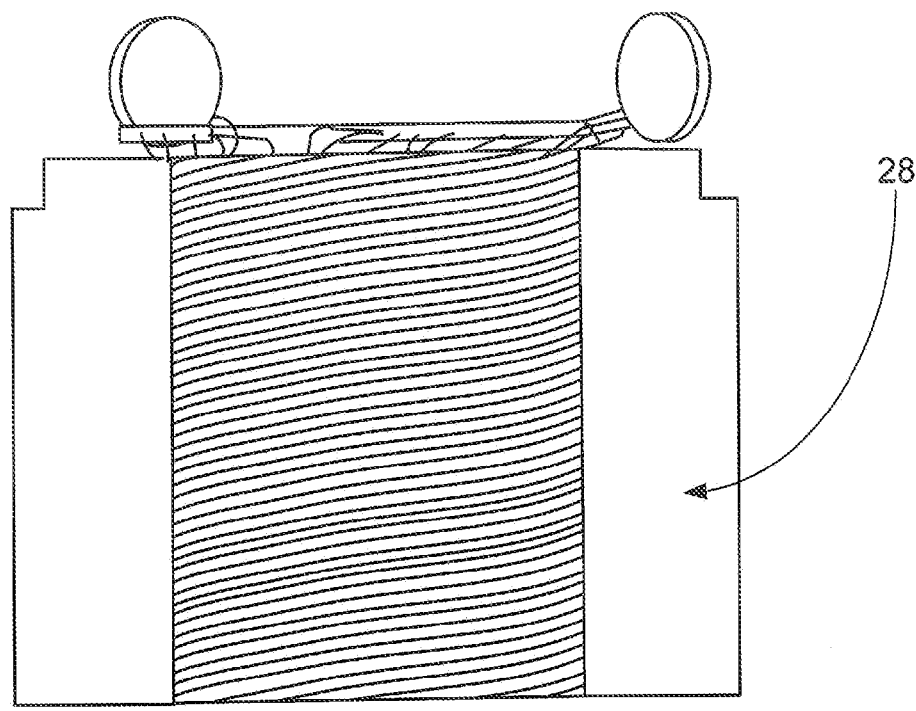

With continuing reference to FIG. 1 and with further reference to FIG. 5, the upper vessel 3 houses the steam generators 20, provides the connections to the feedwater inlet 21 and steam outlet 22 lines and may include penetrations for the reactor coolant inventory and purification system (not shown). The steam generator 20 includes a cylindrical inner shell 24 which is the upper flow shroud 24 which structurally separates the central riser region 90 from the annular downcorner region 92 in which the helical steam generators are located.

With further reference to FIGS. 6A through 6D, the steam generator 20 is a helical coil tube design which in one contemplated embodiment has an inner diameter (ID) of about 66 inches and an outer diameter (OD) of about 120 inches. Other dimensions are also contemplated. The steam generator 20 optionally includes a plurality of (e.g., four, six, or eight) separate, intertwined sections which permits isolation of any section so the plant can continue to operate at reduced power. The tubes are connected at each end by pigtail sections to one of four sets of tubesheets 27. Tube 28 to tubesheet 27 connections of FIGS. 6A-6D are illustrative, not all tube 28 to tubesheet 27 connections are shown, for example tubes 28 may operatively connect to any or all portions of the tubesheet 27.

The helical steam generator 20 is operatively supported by the upper vessel 3. In one suitable support arrangement, the inside diameter is increased at an upper end of the upper vessel 3 to provide a seating surface 36 to support the steam generator 20, and the weight of the steam generator 20 is supported from this point via the upper steam generator support structure 35. In a suitable illustrative embodiment, the upper vessel is composed of multiple ring forgings of SA508 Gr 4N Cl 2 carbon steel, and the final weldment is clad internally with 0.25" stainless steel.

Figure 7A:
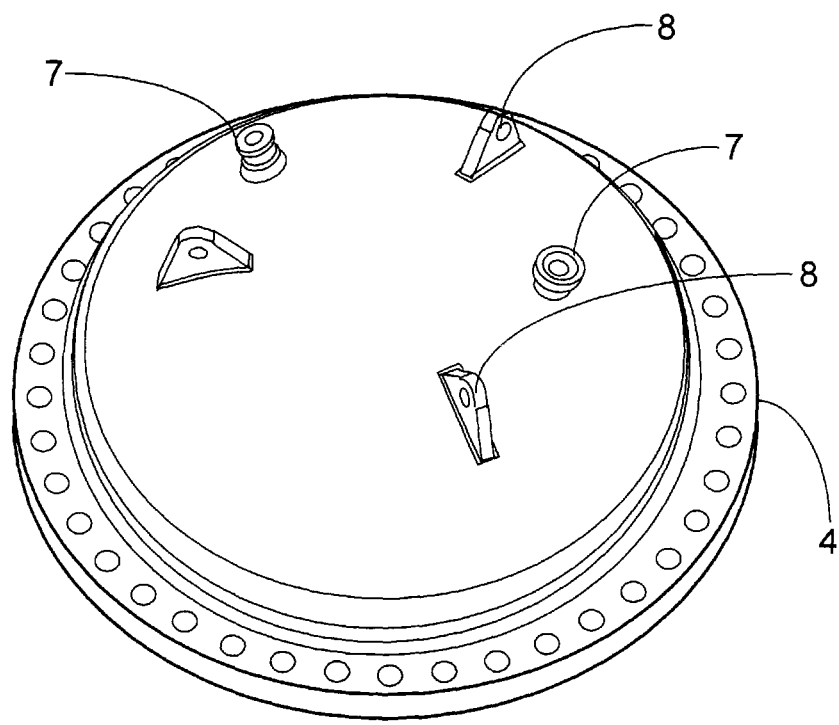
FIG. 7A is a perspective view of a upper vessel head of a PWR.
Figure 7B:
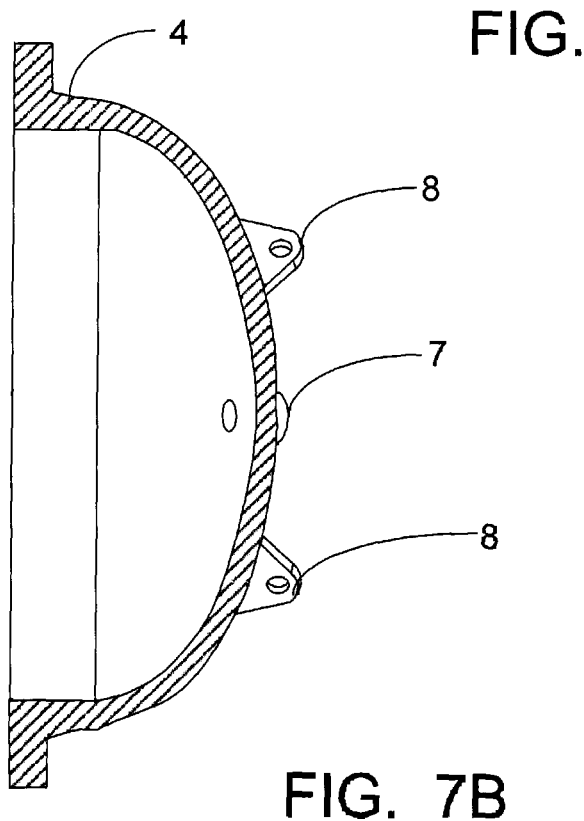
FIG. 7B is a sectional side view of a upper vessel head of a PWR.

With reference to FIG. 1 and with further reference to FIGS. 7A and 713, a upper vessel head 4 is show as separate PWR component. Alternatively, the upper vessel head may be integral with the upper vessel 3, in which case the steam generator 20 and upper shroud 24 are optionally supported from lugs on the inside of the upper vessel head 4. The upper vessel head 4 suitably includes attachment nozzles 7 for in-core instruments, the reactor coolant inventory and purification system (RCIPS) spray nozzle and a vent nozzle. The upper vessel head 4 may optionally utilize either more of less nozzles 7 than that graphically illustrated in FIG. 7A. The upper vessel head 4 may optionally also includes lifting lugs 8 capable of lifting both the upper vessel 3 and head 4.

With continuing reference to FIGS. 1 and 5 and with further reference to FIGS. 6A-6D, some illustrative steam generator 20 embodiments are disclosed. Steam generators 20 transfer heat from the primary coolant to the secondary feedwater in order to generate steam for driving the turbine-generator. In the disclosed integral reactor design the primary reactor coolant flows across the outside of the tubes 28 and the secondary coolant flows inside the tubes 28, and the reactor pressure vessel 10 contains the reactor core 50, steam generators 20 and primary cooling system. The reactivity control rod drive mechanisms 40 are also optionally wholly contained in the pressure vessel 10.

In some suitable embodiments that optimize the reactor vessel space available for steam generation, a helical-coil, once-through steam generator is used in integral reactor vessel. This steam generator concept is depicted in FIGS. 6A-6D and 8-13 and in a suitable embodiment uses 726 Inconel tubes of 0.75-inch outside diameter tightly wrapped in an annulus created by the central primary flow riser pipe above the core 50 and the inside diameter of the reactor vessel. The aforementioned Inconel tubes are merely an illustrative example, and other tubing materials and sizes are also contemplated. The helical tubes 28 offer some specific advantages from the standpoint of heat transfer. The helically-coiled tubes 28 are arranged such that liquid flow, or feedwater, enters the tubes above top of the reactor near the mid-level of the vessel at a feedwater inlet 21, and spirals upward as it absorbs energy from the downward flowing reactor coolant outside of the tubes in the steam generator annulus. The liquid inside the tubing is at lower pressure than the reactor coolant fluid, and transitions to steam along the length of the steam generator. When the fluid in the tube reaches the steam generator outlet 22, it has transitioned to pure steam, at a temperature approximately 50° F. above its saturation point. This provides steam delivered to the power-generating steam turbine that is free or substantially free of undesired liquid droplets.

The designed helical-coil steam generator is effectively a once-through, two phase, counter-current heat exchanger with boiling occurring on the inside of the tubes. The secondary fluid enters the bottom of the steam generator in a sub-cooled single phase condition, and is heated by forced convection to the point of saturation. The saturation point generally occurs in the lower 20% of the tube bundle length. In practice, subcooled boiling may occur prior to the point of bulk fluid saturation. In the following, however, the effects of subcooled boiling on heat transfer are conservatively ignored. After the point of saturation, nucleate boiling is initiated in the tube. Nucleate boiling provides high heat transfer rates, resulting in the rapid vaporization of the fluid as it travels up the tube. As higher secondary fluid qualities are reached, departure from nucleate boiling occurs, along with the associated decrease in heat transfer rates. At the upper end of the generator, the fluid is completely vaporized, and heat is transferred to the steam via forced convection. The primary fluid from the reactor core enters at the top of the steam generator, and traverses down outside the tubes or "shell side" of the steam generator. Heat transfer on the primary side is due to single-phase, forced convection. Since the helix angles are small (i.e. less than ten degrees) the flow is essentially in a cross-flow orientation.

With reference to FIG. 8, a unique feature of two-phase counter-flow exchangers when compared to single-phase exchangers is the existence of a thermal "pinch point" that can limit heat transfer performance. FIG. 8 shows the temperature profiles for a hypothetical case on the primary and secondary sides of the generator. The secondary fluid quickly heats up in the forced convection region at the bottom of the bundle. As vaporization initiates, the secondary temperature profile flattens out until the superheated steam region, where temperatures again rise. Depending on the primary flow rate and entering temperature, the secondary fluid temperature may closely approach that of the primary at the end of the forced convection region. This reduces heat transfer to the secondary side, and greatly increases the amount of surface area needed to satisfy the heat transfer requirements. This undesired effect on heat transfer can be alleviated, for example, by increasing the primary fluid temperature and/or flow rate, or reducing the secondary delivery pressure.

Figure 9:
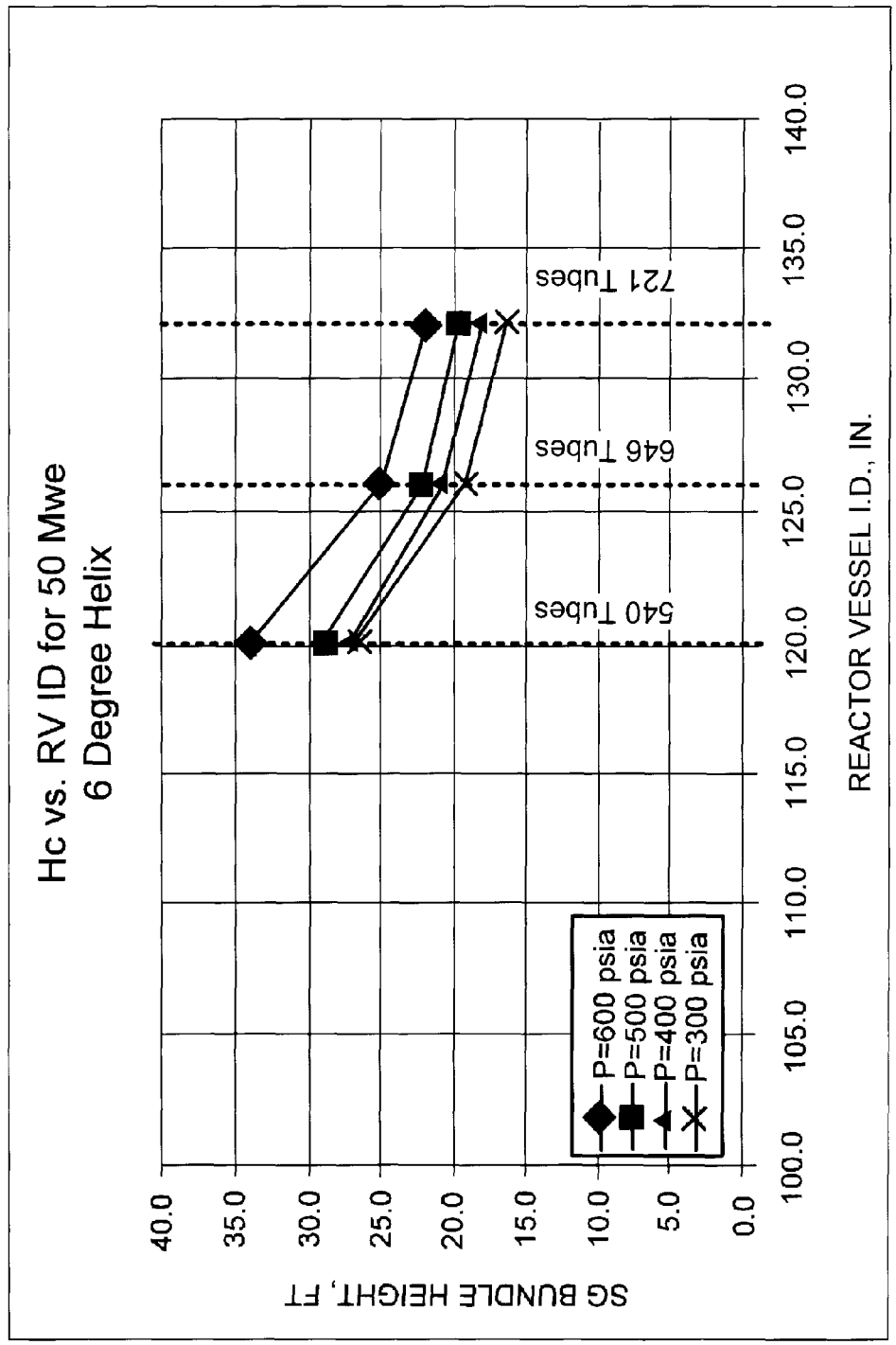
FIGS. 9-11 illustrate the results of a parametric analysis.
Figure 10:
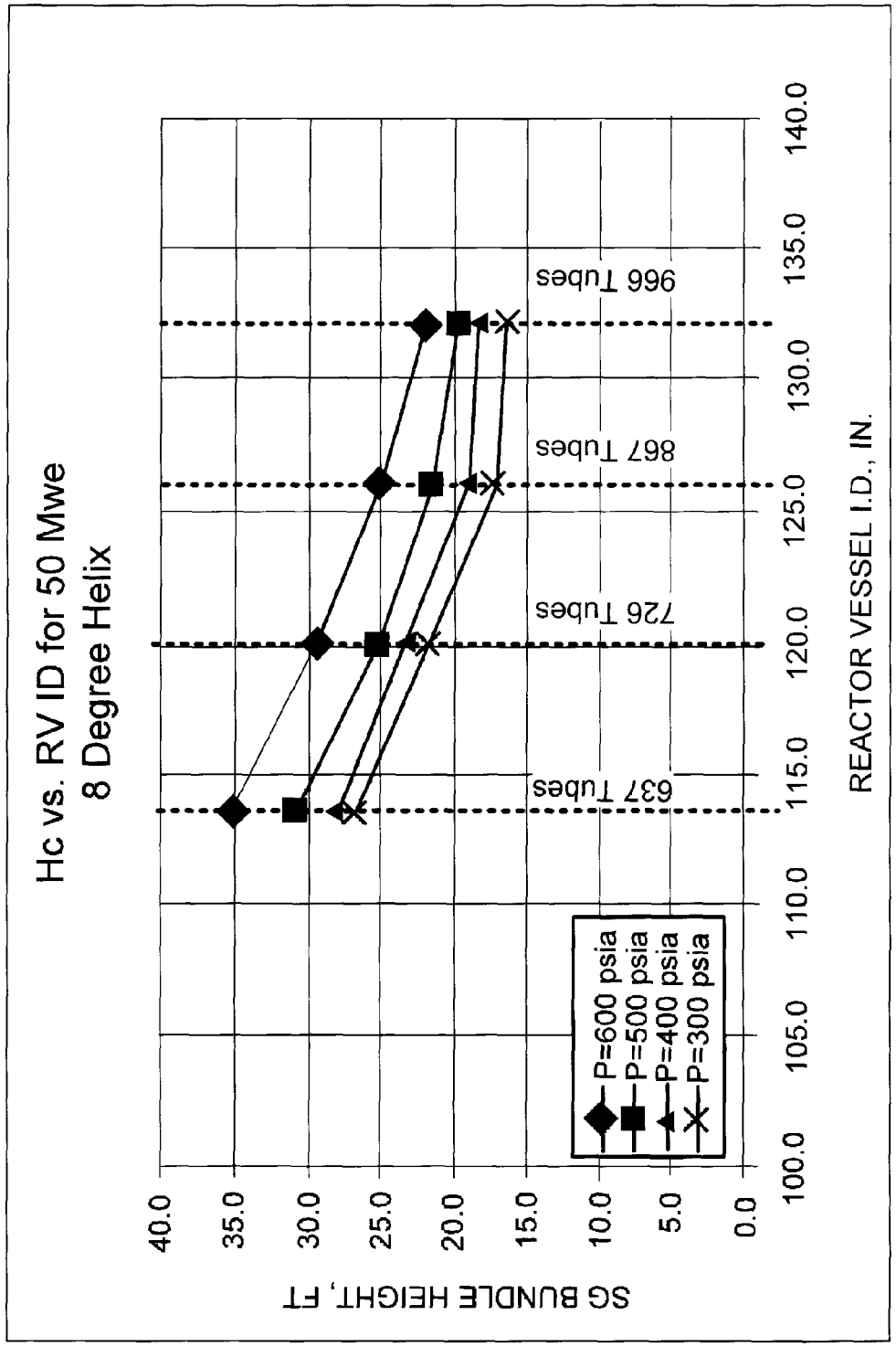
Figure 11:
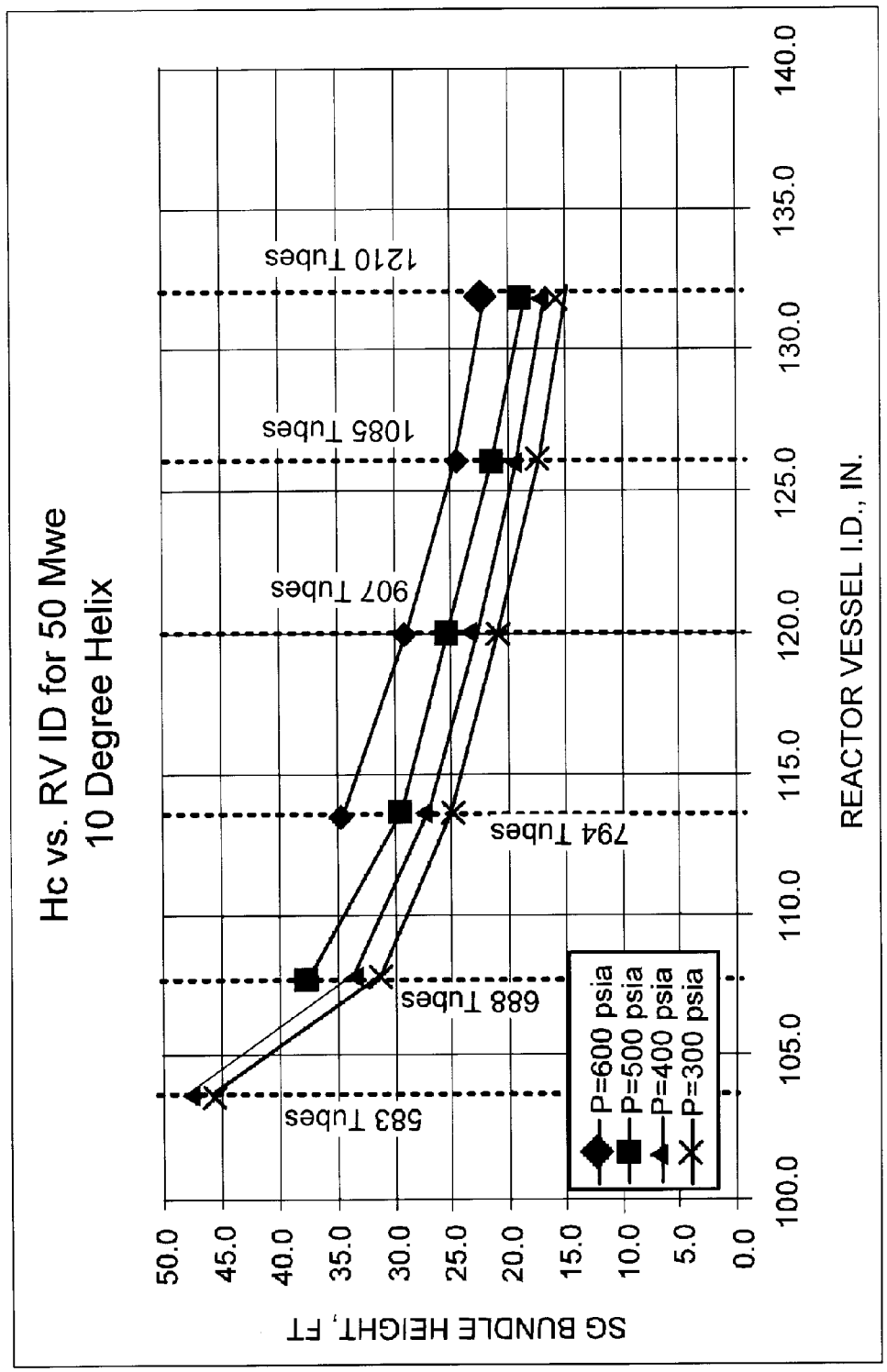

FIGS. 9, 10, and 11 illustrate the results of a parametric analyses relating to steam generator design. For a given bundle geometry, the tube length (and hence the overall bundle coil heights) was varied until the desired heat transfer load was achieved. FIG. 9 for example, shows the parametric results for a six-degree helix. Combinations of bundle height and reactor vessel diameter which satisfy the overall heat load design parameters are plotted, with the steam generator exit pressure as a parameter. Secondary exit pressures from 300 to 600 psia were analyzed. FIGS. 10 and 11 show similar results for an eight and ten-degree helix angle, respectively. All three helix angle cases illustrate the trade-off between bundle height and vessel diameter which exists for a given heat load requirement. As the vessel diameter is decreased, the bundle length required for heat transfer increases. Higher exit pressures require a longer bundle for a given reactor diameter. A comparison of FIGS. 9-11 shows that for a given reactor diameter and exit pressure, the required bundle height goes down as helix angle is increased. This results from the increased number of tubes and the associated thermal-hydraulic changes on the secondary side. The increased helix angle therefore allows for smaller vessel diameters to be considered, while maintaining the overall length within reasonable limits.

FIGS. 9-11 further illustrate that an increase in helix angle results in more tubes and a lower secondary pressure drop for a given space envelope. The higher angle also results in a shorter helical bundle. However, a low helix angle insures that the shell-side flow remains essentially in pure cross-flow, thus maintaining high shell-side heat transfer coefficients, and the slanted orientation of the tube, in addition to the coiled flow path, result in a smoother transition from nucleate boiling to film boiling, unlike vertical tubes, which tend to feature a more abrupt transition. Although analysis of helix angles greater than ten degrees are not shown, helix angles of greater than ten degrees, including up to 15 degree, are contemplated for use in the disclosed helical steam generators. Similarly, helix angles of less than six degrees, including down to about 4 degrees, are contemplated for use in the disclosed helical steam generators Based on the results of the parametric studies, an eight-degree helix angle, with a 120.0-inch vessel inside diameter, and a helical bundle height of 28.9 feet (corresponding to a tube length of 208 feet) was selected as a baseline case.

Figure 12:
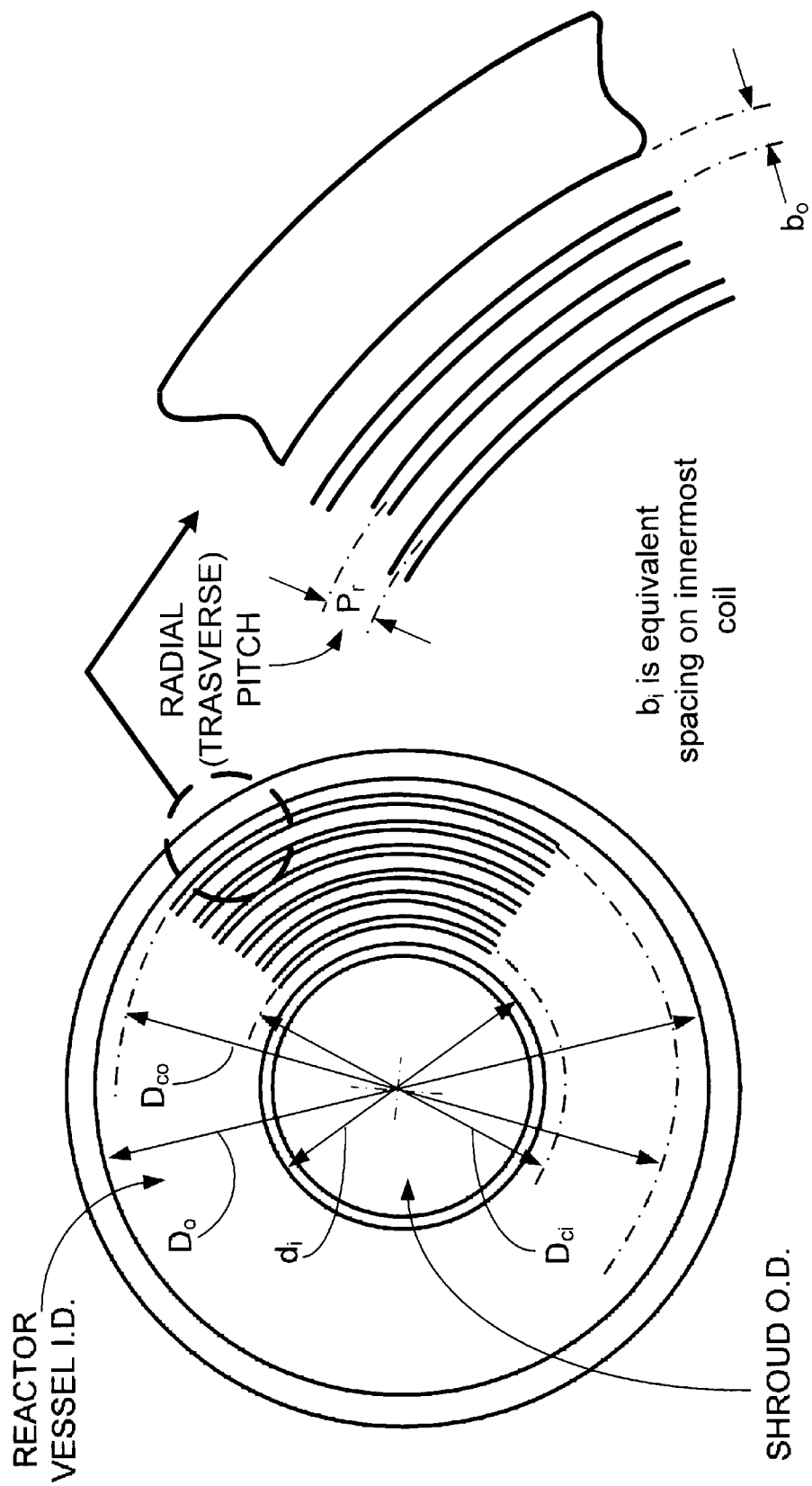
FIGS. 12 and 13 illustrate helical coil steam generator design parameters.
Figure 13:
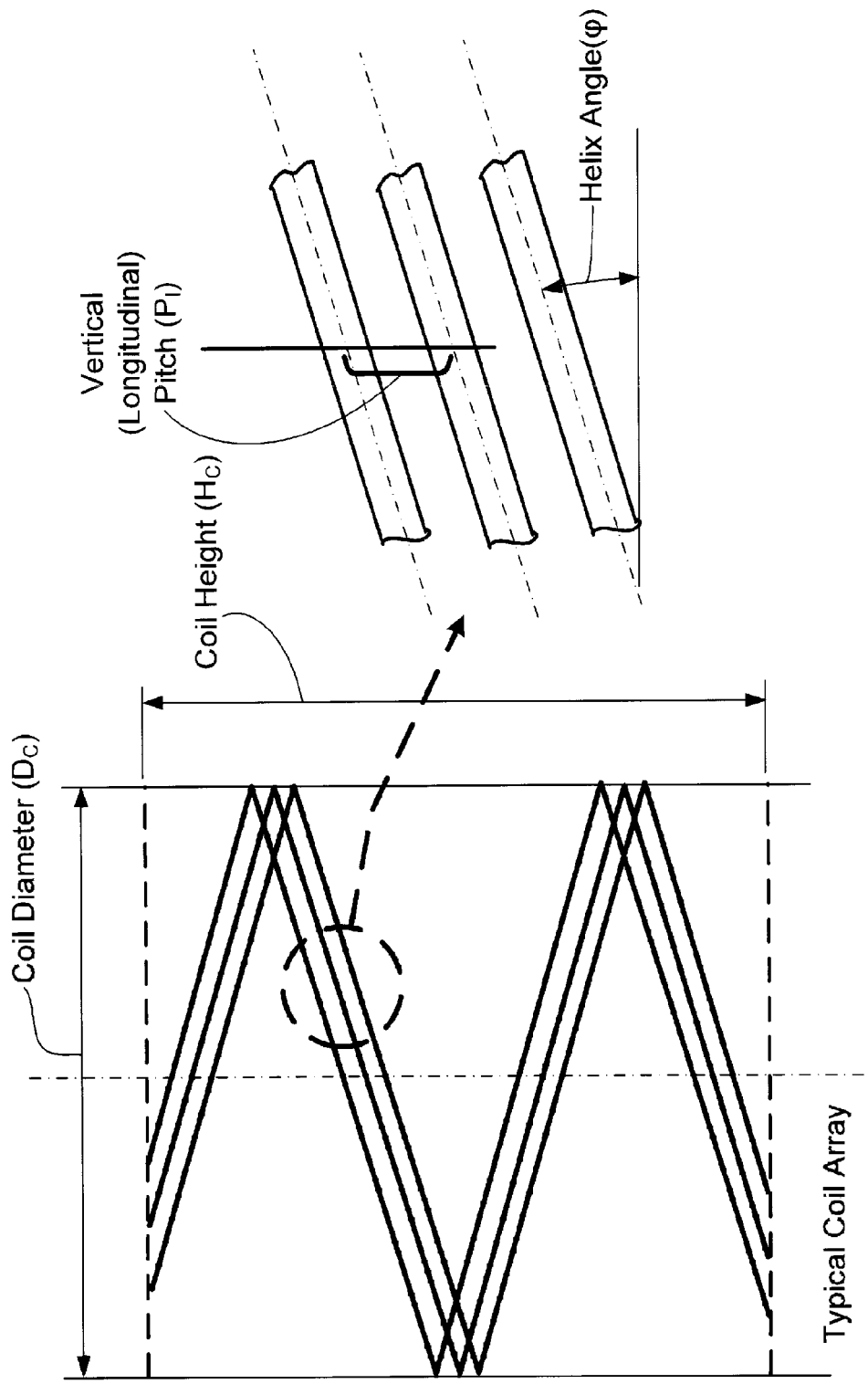

FIGS. 12 and 13 further illustrate a steam generator design of an integral steam generator which includes an array of helically-coiled tubes placed in the annular region between the outside diameter of the upper shroud and the inside diameter of the upper shell. The tubes are arrayed in coil rows in which the number of tubes and the helix radius increase progressively in going from the innermost to outermost coil row. The number of tubes in each coil row progresses approximately linearly with the increase in coil row radius. Each tube in a particular coil row exhibits the same helix angle, however the helix angle varies slightly from coil row to coil row, being distributed around the overall bundle nominal helix angle. The variation in helix angle from coil row to coil row comports with the tubes in a coil row being equally distributed circumferentially, and with the number of tubes in the set being an integer. The lateral pitch is defined as the radial distance between coil row centerlines. The vertical pitch is defined as the vertical distance between tube centerlines. Both of these pitch values remain constant at all locations in the bundle, as diagrammatically shown in FIG. 13.

The steam generator tubes enter the vessel at the lower end of the steam generator section, through a number of tube sheet assemblies originating around the feedwater inlet 21. The tubes are then routed from the nozzle to the helical section of the steam generator, and progress in a helical pattern up to the top of the steam generator section, finally being routed to the exit tubesheet assemblies 27 shown graphically in FIGS. 6A-6D. The tube runs extending from the nozzles to the helical section of the bundle are referred to as "pigtails". If the pigtail entrance and exit regions are ignored, each tube in the bundle has approximately the same total length and axial height (slight variations occur from coil row to coil row due to the variations in helix angle). The number of turns varies inversely with radius from coil row to coil row. For the illustrative example, the coil rows are assumed to be co-wound, i.e. all coil rows are of the same helical direction. It is noted that although the lateral and vertical pitch values remain constant at each location in the bundle, the relative orientation of the adjacent coil rows varies continuously with circumferential angle between in-line and staggered.

A mechanical support for the helical steam generator tube array is optimally composed of interlocking combs or support structure which supports each tube at various circumferential locations. The support assemblies may then be attached to bottom of the steam generator support structure 35.

With returning reference to FIGS. 1, 2, 3, and 3A the DHRS is described further. The DHRS provides a redundant method of removing core decay heat in the event that the normal, non-safety, heat removal systems are unavailable. The illustrated DHRS includes a plurality of independent closed-loop heat removal systems that operate by natural circulation. Each loop extends from a helical coil heat exchanger 55 at the top of the lower reactor vessel, to one of two water pools located outside of the containment. Water from the pools flows into the DHRS heat exchangers where it is turned to steam. The steam flows back into the pool and is discharged through spargers into the pool. In some embodiments, each DHRS loop is capable of removing 1.8% to 2.4% of rated core power when the reactor is at normal operating pressures and temperatures, thus enabling any one of the plural (e.g., four) loops to remove 100% of decay heat within approximately ten minutes after reactor shutdown (worst case) and two loops remove 100% of decay heat within approximately 15 seconds after reactor shutdown (worst case). The dedicated DHRS can operate over a variety of temperatures allowing the system (all four loops) to remove approximately 1.3% of rated core power when the reactor pressure is reduced to 50 psia. With two of the four loops available, the system is enabled to handle 100% of core decay heat within approximately six hours after shutdown.

Because the dedicated DHRS heat exchangers are located in the lower reactor vessel, the system can passively remove decay heat during all phases of plant operation, including refueling. The DHRS utilizes four heat exchangers inside the lower reactor vessel to remove heat from the reactor coolant without allowing the reactor coolant to escape from the reactor vessel.

In a suitable embodiment, each DHRS loop consists of approximately 14 tubes that are 1.5 inches in outside diameter. The four sets of heat exchanger tubes are optionally wound together to form a single helical bundle in the reactor vessel down corner. Each loop has separate inlet and outlet tube sheets to assure complete isolation and the loop in some embodiments is designed to 1600 psia up to the outside containment isolation valve, allowing a loop with a tube leak to be isolated without releasing reactor coolant inside or outside of the containment.

Two large, approximately 30,000 gallon, pools of water serve as ultimate heat sink for the DHRS in the event of loss of normal heat removal systems. During normal operation, the pools are cooled by the plant service water cooling system which rejects plant waste heat through the main cooling system towers.

The illustrative reactor of FIG. 1 is a natural circulation integral reactor with reactor core 50, steam generators 20, control rod drives 40, and decay heat removal heat exchangers 55 located inside a single reactor vessel 10. The reactor pressure vessel 10 is divided into three sections. The lower section 1 houses the reactor core 50. The core 50 is located within a shroud separating riser and downcomer sections. Near the top of the lower vessel 1, in the downcomer region, are four independent DHRS heat exchangers 55 designed to remove core decay heat in the event that normal heat removal paths are lost. Bypass flow holes 67 in the core shroud above the steam generator allow coolant flow, even when the reactor vessel is only partially filled with water. There are no reactor coolant penetrations in this section. The upper portion of the lower section 1 provides a support flange 53 for the upper internals 2. The upper internals structure 2 is composed of an upper internals basket 46, a CRDM support structure 48, control rod guide frames 44, a mid flange 29, and the control rod drive mechanisms 40. The upper vessel 3 houses the steam generators 20. The upper vessel head 4 attaches to the top of the upper vessel 3 and may optimally include a steam bubble generated by core heat to pressurize the reactor. Both the upper vessel 3 and upper spool 6 of the lower vessel 1 may be removed during refueling, allowing the steam generator inspection to be conducted away from the reactor core.

The illustrative integral PWR of FIGS. 1-7B employs natural circulation, in which heating of the primary coolant by the reactor core 50 causes the primary coolant to circulate by flowing upward through the riser 90 defined by the upper shroud and back downward in the outer annulus 92 defined by the shroud and the pressure vessel. The downward flowing primary coolant interacts with the steam generators.

Figure 14:
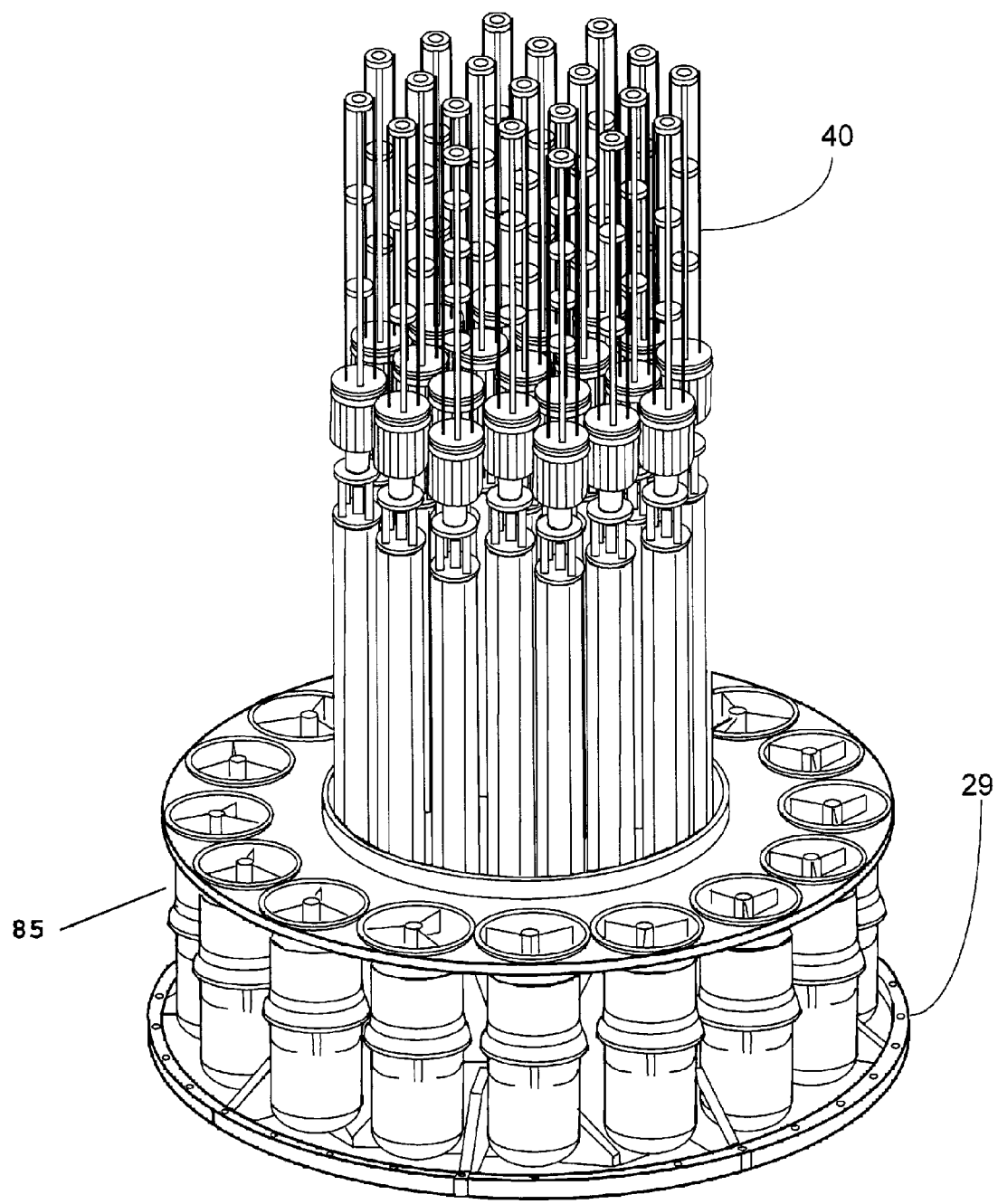
FIG. 14 is a perspective view of a PWR upper internals pump assembly.

With reference to FIG. 14, an alternative design is illustrated, which employs forced convection powered by primary coolant circulating pumps. The design of FIG. 14 is also an integral pressurized water reactor (PWR) design, and has a three-section design including: (i) a lower vessel 1 similar to that depicted in FIG. 2; (ii) upper internals 2 similar to those depicted in FIG. 3; (iii) an upper vessel 3 similar to that depicted in FIG. 5; and (iv) an upper vessel head 4 similar to that depicted in FIGS. 7A and 7B, which may or may not be integral with the upper vessel 3. The forced convection design of FIG. 14 includes integral steam generators, which in some embodiments are suitably embodied by the helical steam generators described herein.

With reference to FIG. 4 the circulating pump feature of a forced convection design is illustrated in FIG. 14. The mid-flange 29 supports the upper internals including, for example, the control rods 40 and internal control rod drive mechanism (CRDM) support structure (not shown). The mid-flange 29 in the force convection reactor of FIG. 14 also supports a plurality of primary coolant circulating pumps 85. The circulating pumps 85 are wholly internal to the pressure vessel 10, for example embodied as canned pumps designed to withstand the operating temperature, pressure, and radiation fluence environment inside the pressure vessel.

Advantageously, the circulating pumps 85 are located at the mid-flange 29 in the annular region between the shroud and the pressure vessel wall. This relatively central location facilitates even flow of the primary coolant. The circulating pumps 85 are optionally not directly coupled with the steam generators, which simplifies connections. The circulating pumps 85 each comprise an impeller that is not connected with any input or output piping.

It will be further appreciated that the octagonal reactor fuel core support 51 illustrated in FIG. 2A for the natural convection reactor is also suitable for use in the forced convection reactor. Moreover, the disclosed octagonal reactor fuel core support can be replaced by other polygonal configurations, such as a hexagonal reactor fuel core support, where again gaps between the walls of the hexagonal reactor fuel core support and the pressure vessel define spaces that can accommodate the dedicated passive DHRS heat exchangers. Round and elliptical configurations are also contemplated.

We claim:

1. A nuclear reactor comprising:
a pressure vessel;
a reactor core disposed in a lower section of the pressure vessel;
a shroud disposed in the pressure vessel and arranged respective to the reactor core such that primary coolant circulates inside and outside the shroud;
a steam generator disposed in an upper section of the pressure vessel; and
at least one passive decay heat removal system (DHRS) heat exchanger comprising a closed loop of tubing configured to operate in a natural circulation condensation mode to remove decay heat from the reactor core to a water pool located outside of the pressure vessel, the closed loop of tubing including a portion disposed in the pressure vessel at a position in a lower vessel section of the pressure vessel relatively closer to the reactor core than to the steam generator, the closed loop of tubing extending via a nozzle through the pressure vessel, the closed loop of tubing extending outside the pressure vessel into the water pool located outside of the pressure vessel;
wherein the DHRS heat exchanger is not part of the steam generator, and the reactor core has a polygonal cross section and the portion of the closed loop of tubing of the at least one DHRS heat exchanger disposed in the pressure vessel at a position in the lower vessel section of the pressure vessel relatively closer to the reactor core than to the steam generator is disposed in a space defined between a wall of a lower portion of the shroud and the lower section of the pressure vessel.

2. The nuclear reactor as set forth in claim 1, wherein the at least one DHRS heat exchanger comprises a plurality of said DHRS heat exchangers.

3. The nuclear reactor as set forth in claim 2, wherein the reactor core is disposed in the lower section of the pressure vessel at or near a bottom of the pressure vessel, and the pressure vessel includes no pressure vessel penetrations whose failure is capable of generating a loss of coolant accident located at or below a level of the at least one decay heat removal system heat exchanger.

4. A nuclear reactor comprising:
a pressure vessel including a lower vessel section and an upper vessel section;
a reactor core housed in the lower vessel section of the pressure vessel;
primary coolant disposed in the pressure vessel;
at least one canned primary coolant circulating pump disposed wholly internal to the pressure vessel; and
an internal steam generator housed in the upper vessel section of the pressure vessel with the upper vessel section including feedwater inlet and steam outlet connections to the internal steam generator, the upper vessel section configured to support the internal steam generator;
wherein the at least one primary coolant circulating pump is disposed in the pressure vessel between the internal steam generator and the reactor core and is not connected with the internal steam generator; and
wherein the pressure vessel further includes a mid-flange disposed between the internal steam generator and the reactor core, the mid-flange configured to support the at least one canned primary coolant circulating pump wholly internal to the pressure vessel.

5. The nuclear reactor as set forth in claim 4, further comprising:
a control rod drive mechanism disposed between the internal steam generator and the reactor core, the mid-flange further configured to support the control rod drive mechanism.

6. A nuclear reactor comprising:
a pressure vessel including a lower vessel section and an upper vessel section and a mid-flange at the junction between the lower vessel section and the upper vessel section;
a reactor core disposed in the pressure vessel in the lower vessel section;
an internal steam generator disposed in the pressure vessel in the upper vessel section vessel with the upper vessel section including feedwater inlet and steam outlet connections to the internal steam generator, the upper vessel section configured to support the internal steam generator; and
at least one wholly internal control rod drive mechanism (CRDM), the mid-flange configured to support the at least one wholly internal CRDM;
wherein the nuclear reactor is configured by the upper vessel section being configured to support the internal steam generator and by the mid-flange being configured to support the at least one wholly internal CRDM to allow the upper vessel section and the supported internal steam generator to be removed independently of the mid-flange and the supported at least one wholly internal CRDM.

7. The nuclear reactor as set forth in claim 6, further comprising:
a shroud having an inner and an outer circumference, the shroud positioned above the reactor core and arranged respective to the reactor core such that primary coolant circulates upward within the inner circumference of the shroud and downward between the outer circumference of the shroud and the pressure vessel.

8. The nuclear reactor as set forth in claim 7, wherein the internal steam generator is a helical coil steam generator comprising of a plurality of steam tubes helically wrapped around an upper portion of the shroud at helix angles between about 4 and about 10 degrees.

9. The nuclear reactor as set forth in claim 8, wherein the helical coil steam generator includes at least two intertwined tube bundles, each bundle have an independent tube sheet.

10. The nuclear reactor as set forth in claim 9, further comprising:
a plurality of primary coolant pumps located along the outer circumference of the shroud, internal to the pressure vessel, and below the helical coil steam generator.

11. The nuclear reactor as set forth in claim 10, further comprising:
at least one decay heat removal heat exchanger located in the lower vessel section of the pressure vessel and below the plurality of primary coolant pumps.

12. The nuclear reactor as set forth in claim 11, wherein the pressure vessel is configured to be self pressurized via a steam bubble located above the shroud in the upper vessel section of the pressure vessel.

13. A nuclear reactor comprising:
a pressure vessel;
a reactor core disposed in a lower section of the pressure vessel;
a shroud disposed in the pressure vessel and arranged respective to the reactor core such that primary coolant circulates inside and outside the shroud;
a steam generator disposed in an upper section of the pressure vessel; and
at least one passive decay heat removal system (DHRS) heat exchanger comprising a closed loop of tubing configured to operate in a natural circulation condensation mode to remove decay heat from the reactor core to a water pool located outside of the pressure vessel, the closed loop of tubing including a portion disposed in the pressure vessel at a position in a lower vessel section of the pressure vessel relatively closer to the reactor core than to the steam generator, the closed loop of tubing extending via a nozzle through the pressure vessel, the closed loop of tubing extending outside the pressure vessel into the water pool located outside of the pressure vessel;
wherein the DHRS heat exchanger is not part of the steam generator and the steam generator comprises a helical steam generator disposed in the upper section of the pressure vessel and circumferentially wrapped around the shroud.

* * * * *